(12) United States Patent
Farmont et al.

(10) Patent No.: US 6,428,093 B1
(45) Date of Patent: Aug. 6, 2002

(54) DEVICE FOR ADJUSTING THE COVER OF A SUNROOF OF AN AUTOMOBILE

(75) Inventors: Rolf Farmont, Dusseldorf; Eckehard Kelm, Gilching, both of (DE)

(73) Assignee: Meritor Automotive GmbH, Frankfurt (DE)

( * ) Notice: Subject to any disclaimer, the term of this patent is extended or adjusted under 35 U.S.C. 154(b) by 0 days.

(21) Appl. No.: 10/026,202

(22) Filed: Dec. 21, 2001

Related U.S. Application Data (63) Continuation of application No. 09/798,374, filed on Mar. 2, 2001, which is a continuation of application No. 09/336,620, filed on Jun. 18, 1999, now abandoned.

(30) Foreign Application Priority Data

Jun. 19, 1998 (DE) ..................................... 298 11 016 U (51) Int. Cl.[7] ................................................ B60J 7/047

(52) U.S. Cl. .................................. 296/223; 296/216.03

(58) Field of Search .................................. 296/223, 224, 296/216.02, 216.03

(56) References Cited

U.S. PATENT DOCUMENTS

| | | | |
|---|---|---|---|
| 1,272,983 A | 7/1918 | Menzo |
| 1,387,062 A | 8/1921 | Marshall |
| 1,787,451 A | 1/1931 | Mohun et al. |
| 2,338,309 A | 1/1944 | Votypka |
| 2,497,419 A | 2/1950 | Schwartz |
| 2,516,702 A | 7/1950 | Kagan |
| 2,853,340 A | 9/1958 | Hershberger |
| 3,845,591 A | 11/1974 | Stine |
| 3,906,669 A | 9/1975 | Vorguitch |
| 4,068,699 A | 1/1978 | Tucker |

(List continued on next page.)

FOREIGN PATENT DOCUMENTS

| | | |
|---|---|---|
| AU | 208672 | 1/1957 |
| CH | 571641 | 11/1975 |
| DE | 30 20 675 | 12/1981 |
| DE | 31 16 641 | 11/1982 |
| DE | 32 23 136 | 3/1983 |
| DE | 33 11 428 | 10/1983 |
| DE | 33 11 452 | 10/1983 |
| DE | 33 16 739 | 1/1984 |
| DE | 33 45 122 | 7/1984 |
| DE | 34 16 176 | 11/1984 |
| DE | 34 42 615 | 5/1986 |
| DE | 34 42 631 | 5/1986 |
| DE | 35 06 460 | 8/1986 |
| DE | 35 36 184 | 11/1986 |
| DE | 37 07 644 | 9/1987 |
| DE | 37 15 268 | 1/1988 |
| DE | 38 02 379 | 8/1988 |
| DE | 39 19 385 | 7/1990 |
| DE | 39 03 035 | 8/1990 |
| DE | 38 01 881 | 1/1991 |
| DE | 39 20 909 | 1/1991 |
| DE | 40 31 750 | 4/1991 |
| DE | 41 00 898 | 7/1992 |

(List continued on next page.)

Primary Examiner—Dennis H. Pedder
(74) Attorney, Agent, or Firm—Vickers, Daniels & Young (57) ABSTRACT

An apparatus for a sunroof that contains at least one cover part for selectively closing and at least partially opening an opening in a rigid roof surface of an automobile. The apparatus is used in conjunction with a roof opening that contains a base part with side parts that lie opposite one another and define a longitudinal direction. The sunroof includes a cover part that can be tilted as well as slid along the longitudinal direction. The apparatus includes a cover carrying element that is connect to the cover part and can be pivoted about a cam pin which extends transverse to the longitudinal direction and can slide along the longitudinal direction.

10 Claims, 9 Drawing Sheets

U.S. PATENT DOCUMENTS

| | | | |
|---|---|---|---|
| 4,286,821 | A | 9/1981 | Cooper |
| 4,403,805 | A | 9/1983 | Strem, Jr. et al. |
| 4,537,442 | A | 8/1985 | Jardin |
| 4,601,512 | A | 7/1986 | Boots |
| 4,609,222 | A | 9/1986 | Boots |
| 4,643,478 | A | 2/1987 | Boots |
| 4,647,105 | A | 3/1987 | Pollard |
| 4,647,106 | A | 3/1987 | Furst |
| 4,699,421 | A | 10/1987 | Schaetzler et al. |
| 4,741,572 | A | 5/1988 | Bauhof |
| 4,746,165 | A | 5/1988 | Fuerst et al. |
| 4,852,938 | A | 8/1989 | Hirshberg et al. |
| 4,893,868 | A | 1/1990 | Miller et al. |
| 4,936,623 | A | 6/1990 | Huyer |
| 4,978,165 | A | 12/1990 | Scheiter et al. |
| 4,982,995 | A | 1/1991 | Takahashi |
| 5,026,113 | A | 6/1991 | DiCarlo et al. |
| 5,100,197 | A | 3/1992 | Ichinose et al. |
| 5,197,779 | A | 3/1993 | Mizuno et al. |
| 5,287,655 | A | 2/1994 | Harvey |
| 5,335,961 | A | 8/1994 | Reinsch et al. |
| 5,362,122 | A | 11/1994 | Reihl et al. |
| 5,421,635 | A | 6/1995 | Reinsch et al. |
| 5,447,355 | A | 9/1995 | Kelm |
| 5,464,267 | A | 11/1995 | Racine et al. |
| 5,484,185 | A | 1/1996 | Salz et al. |
| 5,603,372 | A | 2/1997 | Farmont et al. |
| 5,632,523 | A | 5/1997 | Kelm |
| 5,671,969 | A | 9/1997 | Sutor et al. |
| 5,765,908 | A | 6/1998 | Kelm |
| 5,816,647 | A | 10/1998 | Farmont |

FOREIGN PATENT DOCUMENTS

| | | |
|---|---|---|
| DE | 39 30 756 | 10/1992 |
| DE | 41 23 229 | 1/1993 |
| DE | 42 01 403 | 2/1993 |
| DE | 93 02 762.1 | 5/1993 |
| DE | 42 38 944 | 10/1993 |
| DE | 93 06 187.0 | 1/1994 |
| DE | 42 27 400 | 2/1994 |
| DE | 44 05 583 | 9/1994 |
| DE | 43 29 583 | 10/1994 |
| DE | 43 29 580 | 11/1994 |
| DE | 44 04 618 | 3/1995 |
| DE | 44 07 286 | 5/1995 |
| DE | 44 15 649 | 6/1995 |
| DE | 196 03 786 | 8/1996 |
| DE | 196 08 916 | 4/1997 |
| EP | 0 309 775 | 4/1989 |
| EP | 0 353 695 | 2/1990 |
| EP | 0 403 388 | 12/1990 |
| EP | 0 480 166 | 4/1992 |
| EP | 0 608 869 | 8/1994 |
| EP | 0 556 420 | 10/1995 |
| FR | 2 591 953 | 6/1987 |
| GB | 349172 | 5/1931 |
| GB | 573355 | 11/1945 |
| GB | 2 258 848 | 2/1993 |
| JP | 1-54208 | 3/1989 |
| JP | 4-90924 | 3/1992 |
| NL | 8 802 552 | 10/1988 |
| WO | WO 94/25301 | 11/1994 |

DEVICE FOR ADJUSTING THE COVER OF A SUNROOF OF AN AUTOMOBILE

BACKGROUND OF THE INVENTION

This application is a continuation of application Ser. No. 09/798,374 filed Mar. 2, 2001, which in turn is a continuation of application Ser. No. 09/336,620 filed Jun. 18, 1999 now abandoned, which in turn claims priority of German Application Ser. No. DE 298 11 016.4 filed Jun. 19, 1998.

The invention pertains to a device for adjusting a cover of an automobile sunroof.

Sunroofs of this type contain at least one cover part for selectively closing and at least partially opening an opening in a rigid roof surface of an automobile, wherein said cover part can be tilted and slid. At least one cover carrying element is connected to the cover part and can be tilted about a first cam pin that extends transverse to the sliding direction of the cover part, wherein said cover carrying element can also be slid along the sliding direction in the tilted position. Guide rails are provided near the edges of the opening in the roof of the automobile in order to realize said sliding, wherein a transport carriage can be slid along said guide rails. In addition, adjustment means are provided for tilting the cover part in such a way that the transport carriage and the cover part carry out a movement relative to one another along the sliding direction. If the cover part of such sunroofs is slid above the roof surface of the automobile, they are generally referred to as "spoiler roofs."

In such spoiler roofs, it is problematic that the same transport carriage is used for realizing the tilting as well as the sliding of the cover part in that the sliding is usually not desired during the tilting process. Consequently, a so-called switching process is required such that when opening the cover part at the end of the tilting phase, the cover part which is initially held and prevented from sliding can be suitably slid toward the rear in the tilted position during the additional sliding of the transport carriage. This process takes place in the corresponding, reverse sequence when the sunroof is closed.

In one known spoiler roof (DE-C2 3,311,452) that was introduced on the market quite some time ago, the cover part is rigidly connected to a cover carrier that can be tilted and slid along a guide rail. In this case, the cover carrier represents a self-contained component that can be slid in the same guide rail as the transport carriage, wherein the tilting axis of said cover carrier is positioned a significant distance in front of the transport carriage (as seen from the forward direction of the automobile). Consequently, the slidable assembly unavoidably has a significant length that limits the maximum degree of opening the cover part. This problem is particularly evident in spoiler roofs of this type, particularly when they are retrofitted into automobiles. In this case, an opening lever is connected to the transport carriage via a cam arrangement and to the cover carrier or the cover part via a turning knuckle in tilted/ articulated fashion. The cam arrangement allows relative movement between the opening lever and the transport carriages. In order to ensure that the cover part is not slid during the upward tilting movement while the transport carriage carries out its initial adjusting movement, the opening lever contains a locking cam that, as the tilting angle of the opening lever increases, continuously moves out of a catch opening in the guide rail, which is stationarily fixed to the frame and into the guide rail, until the locking cam is entirely located in the guide rail and can be slid therein. This means that all moving sequences must be coordinated in such a way that the cam arrangement between the transport carriage and the opening lever has reached the position in which the sliding of the cover part was started at exactly the instant in which the locking cam is completely moved into the guide rail. This switching process is associated with a certain jolt because the guide rail of the cam arrangement which initiates the switching process and starts the sliding process must have a significant inclination of approximately 40° so as to not transmit excessively high clamping forces upon the various cams during the subsequent forward sliding of the tilted cover.

During the forward sliding of the tilted cover part, one encounters the problem that the locking cams are guided in the same guide rail as the tilting cam of the cover carrier and the transport I C,. carriage, and that the locking cam must prevent a backward tilting of the cover part into the closed position during this sliding phase of the cover part. Consequently, the friction, to which the locking cam is subjected in the guide rail, increases in proportion to the flatness of the guide rail of the cam arrangement which causes the aforementioned switching processes. This is the reason a compromise had to be found between the intensity of the jolt and the intensity of the friction.

The previously described problems were significantly reduced when a spoiler roof (DE-C2 4,405,583) was introduced to the market at a later time. In this adjusting device, a toggle lever arrangement without guide curves is used instead of a cam arrangement consisting of a guide curve and cams. In this case, only one component that can be slid in a guide rail fixed to the frame is provided. This component accommodates the transport carriage as well as the cover carrier and makes it possible for both of these components to move relative to one another. A locking pin assigned to the roof carrier serves for locking the cover carrier to the rigid roof frame of the automobile during the tilting phase of the cover part. This locking pin cooperates with an opening in the guide rail that is rigidly connected to the automobile. In this known adjusting device, the length of the movable assembly was reduced in comparison to previously known arrangements, and the friction during the forward and backward sliding is, significantly reduced in particular. In addition, the jolt occurring during the switching process was practically eliminated due to the elimination of the cam arrangement between the opening lever and the transport carriage. However, this adjusting device still has the disadvantage of a relatively complex design and, specifically, a large number of components, the assembly of which is correspondingly complicated.

A significant reduction in the required components was achieved with the adjusting device according to WO 94/25301 which was introduced to the market at a later time. In this case, only a cover carrier, a transport carriage and a guide rail are required. Even the locking of the cover part in the closed position within the rear region of the cover part can be achieved with the previously described components. This is essentially achieved due to the fact that the pins for tilting the cover carrier are always guided in guide curves that intersect, wherein one guide curve is rigidly arranged on the automobile and the other guide curve is arranged in the transport carriage. This also makes it possible to eliminate locking elements for holding the cover carrier during the tilting phase. The basic principle of guide curves that intersect one another and serve for simultaneously accommodating the tilting axes for a cover carrier is also known from Japanese Patent No. 1-54 208. In both of these adjusting devices for spoiler roofs, the simplicity of which can scarcely be additionally improved, a noticeable jolt during the transition from the tilting phase to the sliding phase of the cover part cannot be eliminated.

SUMMARY OF THE INVENTION

In a device for adjusting spoiler roofs of the initially mentioned type, the invention is based on the objective of minimizing the resistance, i.e. the friction during the transition from the tilting phase to the sliding phase or from the sliding phase to the tilting phase of the cover part despite the relatively short length of the transport carriage and a minimization of the required components.

This objective is attained with an adjusting device, wherein at least one engagement means for separately engaging at least one transport carriage and the adjusting means, e.g., a cover carrier, is provided in order to tilt the cover part. In this case, the guide element for the carriage element (transport carriage) is provided with at least one control means, such that the carriage element and the adjusting element are effectively engaged in the sliding direction, i.e., they are unable to carry out relative movements when the carriage element is slid between positions, between which the cover part is merely slid along the sliding direction in the tilted position. When the carriage element is slid between positions when the cover part is essentially aligned with the roof opening and merely tilted, the carriage element and the adjusting element are not engaged, i.e., they are able to carry out relative movements in the sliding direction.

In contrast to the state of the art according to DE-C2 3,311,452 or DE-C2 4,405,583, the cover carrier is no longer engaged to the guide element, i.e., the guide rail that is rigidly fixed to the roof, by means of a separate engagement arrangement, but the separate engagement element acts between the cover carrier or, in general, the adjusting means of the roof part and the carriage element, i.e., the transport carriage.

Thus, the typical jolt that occurs during the transition from the tilting phase into the subsequent sliding phase of the cover part is eliminated. This is attained due to the fact that the cover part is not disengaged from an initially engaged position by the engagement means at the end of the tilting of the cover part because the engagement means according to the invention is already in the disengaged position during the tilting phase and consequently does not fulfill the function of holding the cover part with respect to the sliding direction during the tilting phase.

In the simplest instance, the engagement means according to the invention only fulfills the function of a driver between the carriage and the adjusting means of the cover part when sliding the cover part into the closing direction. Thus, frictional resistance as described previously with reference to DE-C2 3,311,452 is reliably prevented. Frictional resistance as it occurs with the intersecting guide curves according to WO 94/25301 can also be prevented with the engagement means according to the invention because any constraints due to intersecting guide curves are practically eliminated during this moving phase as well as during the transition from the sliding phase into the tilting phase or from the tilting phase into the sliding phase.

Due to the very simple means according to the invention, excellent advantages can be realized. These advantages are described in detail below with reference to various embodiments.

Additional characteristics that pertain in particular to the various options of designing the engagement means as well as transitions between the tilting phase and the sliding phase or the sliding phase and the tilting phase which are subject to particularly unnoticeable jolts are disclosed.

The aforementioned components as well as the components claimed and described in the embodiments and the components to be utilized in accordance with the invention are not subject to any particular restrictions regarding their size, shape, material selection and technical concept, i.e., the selection criteria known in the respective field of application can be applied in unlimited fashion. Additional details, characteristics and advantages of the invention result from the following description of the corresponding figures which show embodiment examples of the adjusting device.

BRIEF DESCRIPTION OF THE DRAWINGS

The foregoing and other objects and advantages will in part be obvious and in part pointed out in the following description taken together with the accompanying drawings in which.

DESCRIPTION OF PREFERRED EMBODIMENTS OF THE INVENTION

Figure 1A:
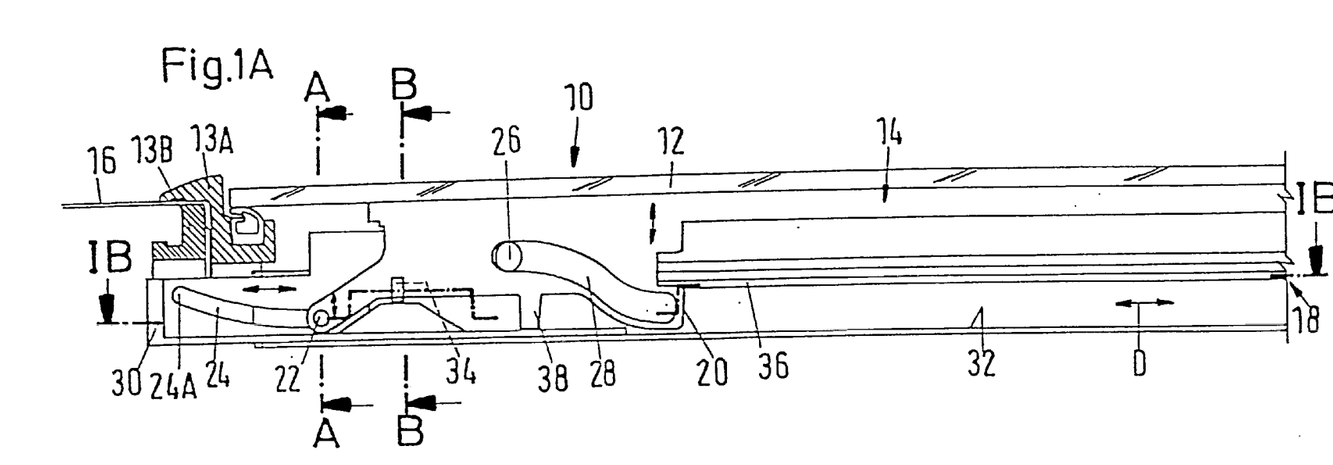
FIG. 1A is a (section of a) spoiler roof that can be retrofitted and installed in the roof of a automobile, wherein the adjusting device is located in the closed position.
Figure 1B:
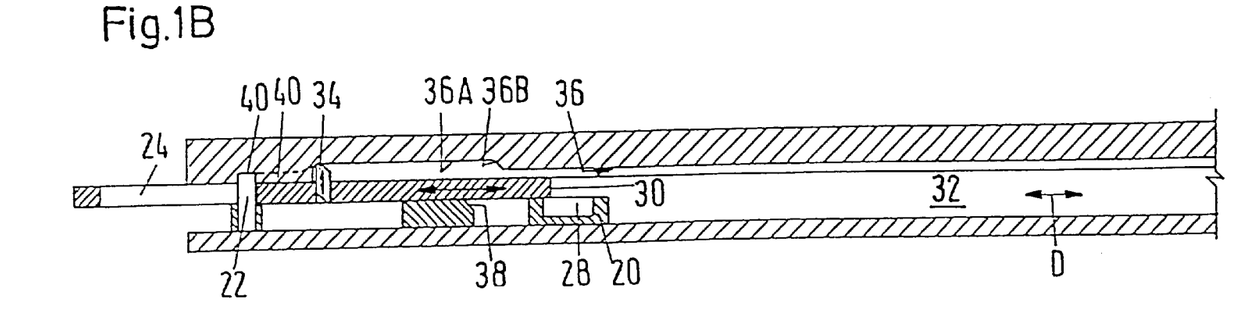
FIG. 1B is a schematic horizontal section through the spoiler roof according to FIG. 1 A along line IB—IB.

In the first embodiment according to FIGS. 1A through 4D, a separate locking arrangement between the cover carrier and the transport carriage is realized in the form of a mechanically controllable engagement means that can be horizontally slid transverse to the sliding direction. This embodiment is described in detail below:

FIG. 1A shows that an approximately rectangular roof opening 14 with conventionally rounded corner regions is arranged in the roof surface 16 of an automobile, e.g., a passenger car (not 1f shown in detail). At the edge of the opening, a two-part frame 13A, 13B surrounds the edge of the roof surface 16 near the opening in sealed fashion, e.g., as known from retrofit sunroofs. Long extended guide elements 32 are connected to the sunroof frame 13A, 13B on both longitudinal edges of the roof opening. These guide elements which, for example, consist of extruded aluminum have the function of guiding carriage elements 30, which are simply referred to as the transport carriages in the following description, along two parallel edges of the sunroof opening, which lie opposite one another, with little friction and play. The transport carriages 30 respectively carry one cover carrying element 20 that is rigidly connected to the cover part 12 which closes the sunroof opening. The cover carrying elements 20 are guided on or in the transport carriages 30 such that they can be longitudinally slid between two extreme positions. The cover carrying elements 20 and the transport carriages 30 are connected via a first front cam pin 22 provided on the carriages element 30 which can be slid in a first guide curve 24 provided in the transport carriage 30 so as to slightly raise the front edge of the cover (shown on the left side in FIG. 1A). A second cam pin 26 provided on the transport carriage 30 can be slid along a second guide curve 28 provided in the cover carrying element 20. This second cam arrangement makes it possible to raise the rear cover edge which is located on the right in FIG. 1A higher than the front cover edge, i.e., to tilt or pivot the cover 12 into the desired ventilation position above the roof surface 16. In order to fulfill this function, the first and the second guide curves 24 and 28 which generally extend in the same direction as the guide elements 32 have a correspondingly curved progression.

In addition, a (third) guide curve 40 is provided. This guide curve is located on the front end of the guide element 32 and initially extends obliquely upward, whereafter it transforms into a horizontal progression. The guide curve 40 guides a part of the first cam pin 22 which extends through the first guide curve 24. Within the first section of the third guide curve 40 which extends obliquely upward toward the rear, the first cam pin 22 and consequently the cover part 12 are prevented from sliding appreciably toward the rear. Within this section, the first cam arrangement rather carries out an upward movement that is only slightly oriented toward the rear, wherein said movement subsequently transforms into a more defined movement toward the rear with a less defined upward movement. Consequently, the transition between the tilting of the cover into the position shown in FIG. 2A and the subsequent cover sliding phase into the open position shown in FIG. 3A takes place very smooth and without jolts. This means that the cover carrying element initially moves significantly more slowly than the transport carriage and only gradually assumes the speed of the transport carriage. A cam arrangement 40, 22 of this type also serves for tilting the cover carrier independently of the carriage/ cover engaging according to the invention and the simultaneous penetration of the additional guide curve 24, i.e., this cam arrangement itself has inventive merit.

To the extent described thus far, all three embodiments of the present invention essentially correspond to the arrangement known from WO 94/25301. The elements which are novel in comparison to the state of the art are described in detail below.

In the embodiment according to FIGS. 1A through 4D, the transport carriage 30 has a horizontal slot in which an engagement means 34 of practically identical cross section is guided in low-friction fashion. The engagement means 34 consists of a relatively short formed piece with inclined surfaces on its ends, wherein said inclined surfaces correspond to a catch limit stop 38 on the cover carrying element 20 and a switching surface 36B of a control means on the guide element 32 which is designated by reference numeral 36. The control means 36 consists of a vertically oriented inner wall region of the guide element 32 which is oriented parallel to the sliding direction (FIG. 1B) of the transport carriage 30 indicated by a double arrow within its entire rear region (its right region in FIG. 1B). The control means 36 only has a different progression within its front region (its left region in the figure), wherein this different progression is realized in the form of a depression 36A in the guide element 32. In this case, one end of the depression is formed by the switching surface 36B.

Figure 2A:
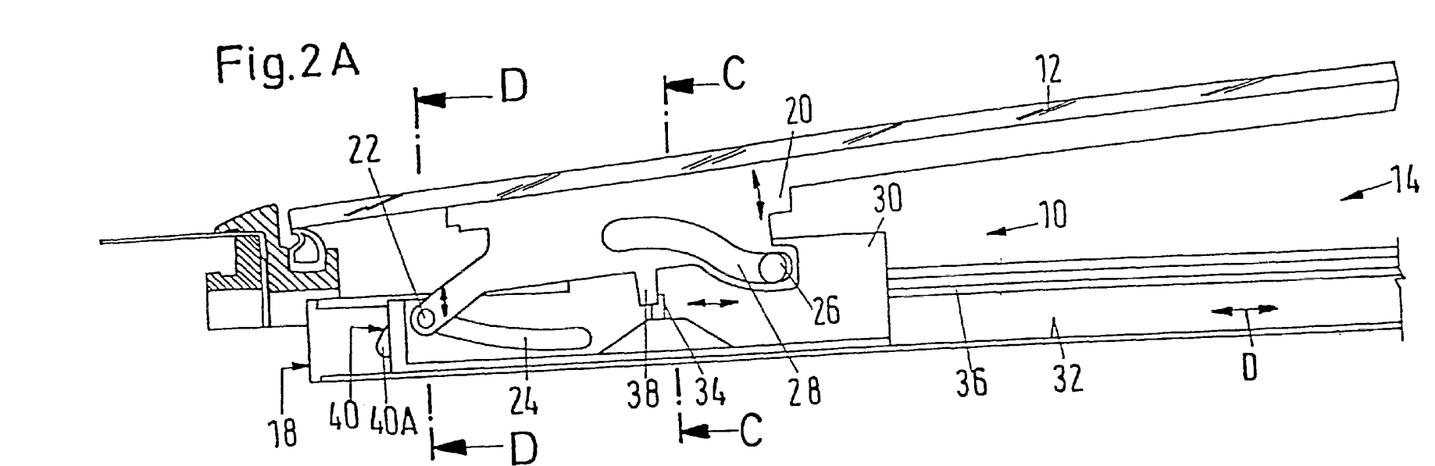
FIG. 2A is the same spoiler roof in an operating position at the end of the tilting phase.

When the cover part 12 is closed and in the carriage positions, in which the cover part is tilted, i.e., in all positions between the carriage positions shown in FIG. 1A and FIG. 2A, the engagement means 34 in the transport carriage 30 is slid outwardly and protrudes into the aforementioned depression 36A of the control means 36, whereby said engagement means does not engage with the cover carrying element 20, but is rather prevented in appropriate fashion.

The first embodiment as well as the two other embodiments indicates that it is preferred to subject the engagement means 34 to a mechanical control based on a suitable orientation of mutual control surfaces, when engaging as well as disengaging the engagement means.

Figure 2B:
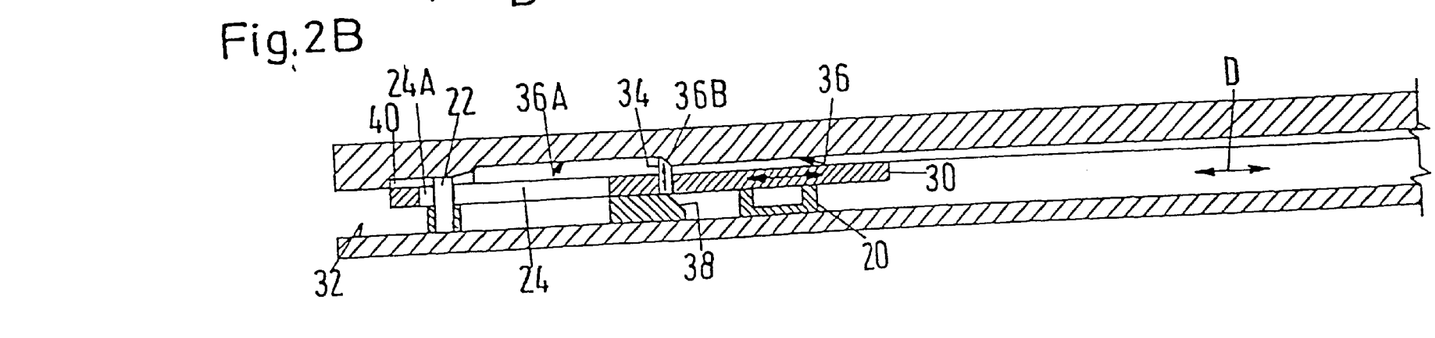
FIG. 2B is a horizontal section through the spoiler roof according to FIG. 2A (corresponding to the illustration in FIG. 1B)

Once the transport carriage 30 is slid into the position shown in FIG. 2A and FIG. 2B, the additional sliding of the transport carriage 30 toward the rear (toward the right in the figure) causes the engagement means 34 to be moved out of its position by means of the switching surface 36B, i.e., the engagement means is moved out of the depression of the control means 36 and simultaneously pressed into the engaged position relative to the catch limit stop 38 on the cover carrying element 20. FIG. 3B shows the new position of the engagement means 34.

During the additional sliding of the transport carriage 30 toward the rear (toward the right in the figure), the engagement means 34 is still not subjected to any stress because the first cam pin 22 is now in contact with the front end of the first guide curve 24 of the transport carriage 30, i.e., the transport carriage 30 drives the cover carrying element 20 toward the rear.

Figure 3A:
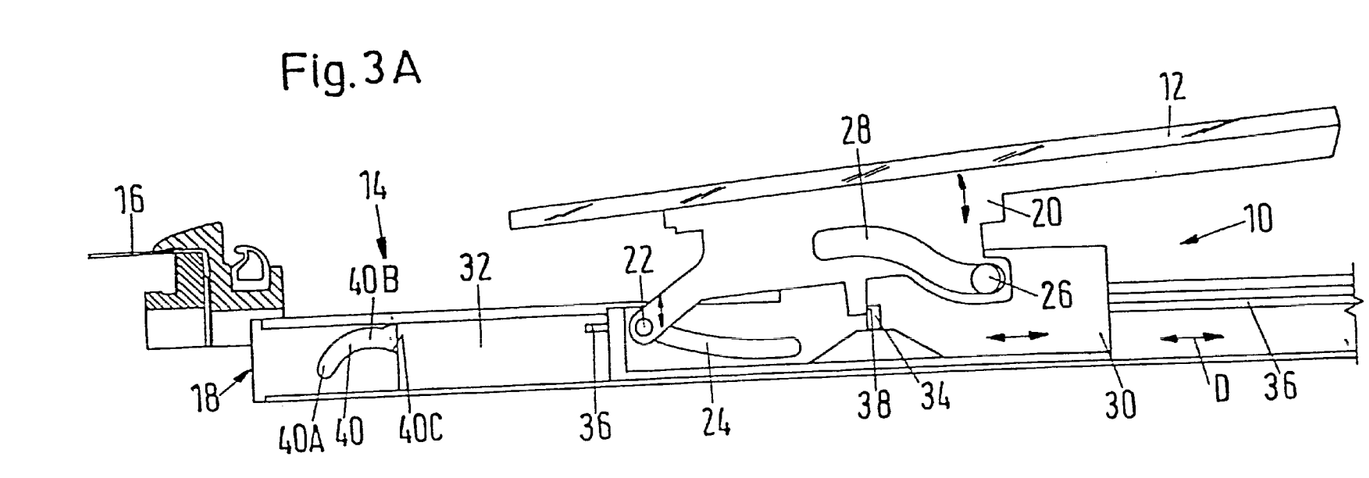
FIG. 3A is the same spoiler roof, wherein the cover part is tilted upward and partially slid toward the rear.
Figure 3B:
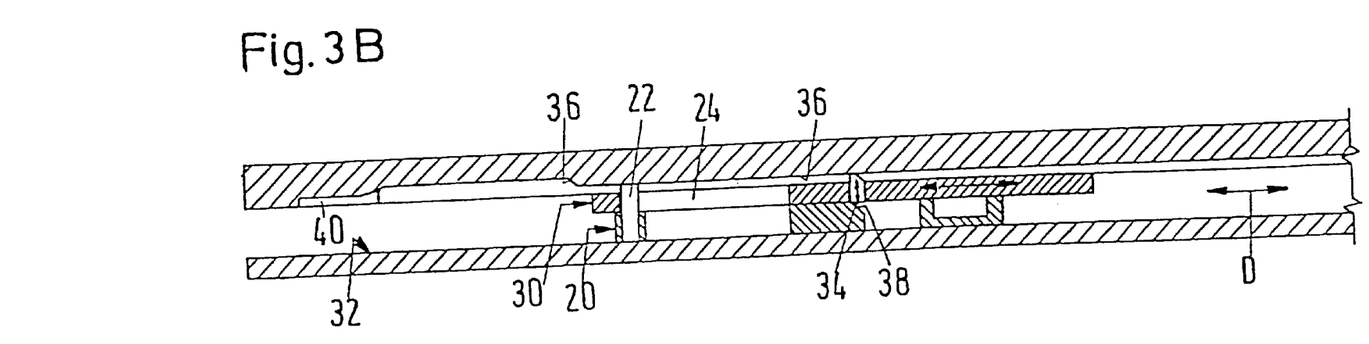
FIG. 3B is a horizontal section through the same spoiler roof during the phase according to FIG. 3A (corresponding to the sectional representations in FIGS. 1B and 2B)
Figure 4A:
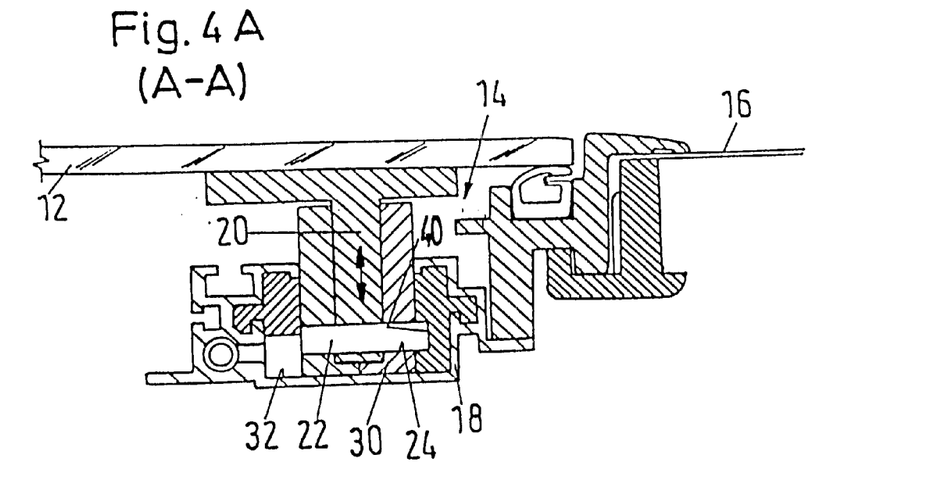
FIG. 4A is a vertical section through the same spoiler roof along line A—A in FIG. 1A.
Figure 4B:
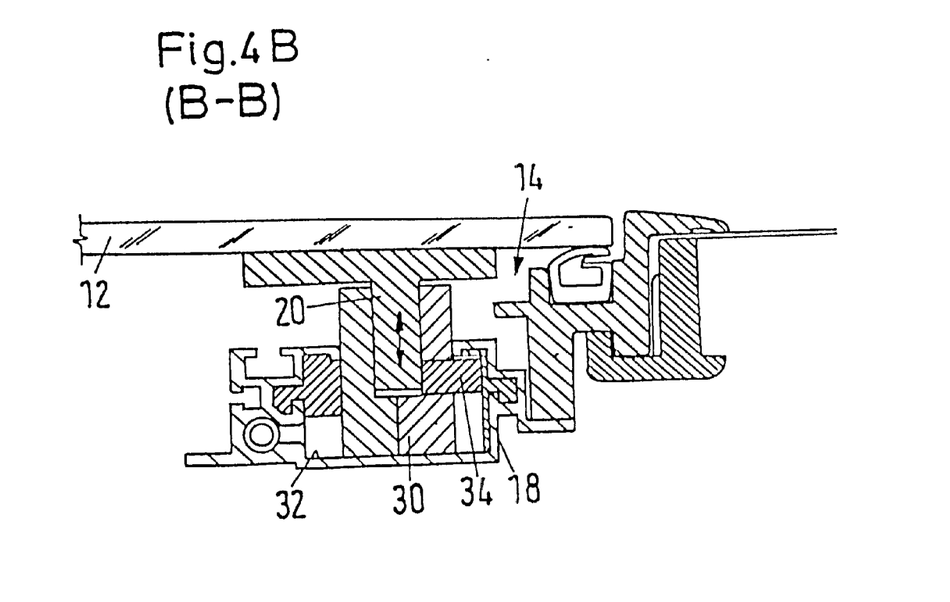
FIG. 4B is a vertical section through the same spoiler roof along line B—B according to FIG. 1A.
Figure 4C:
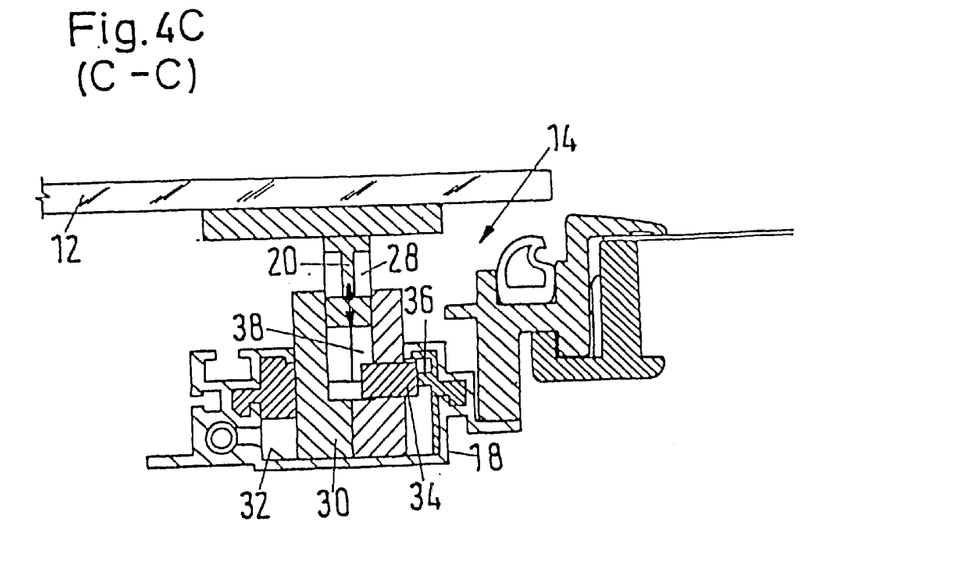
FIG. 4C is a vertical section through the same spoiler roof along line C—C according to FIG. 2A.
Figure 4D:
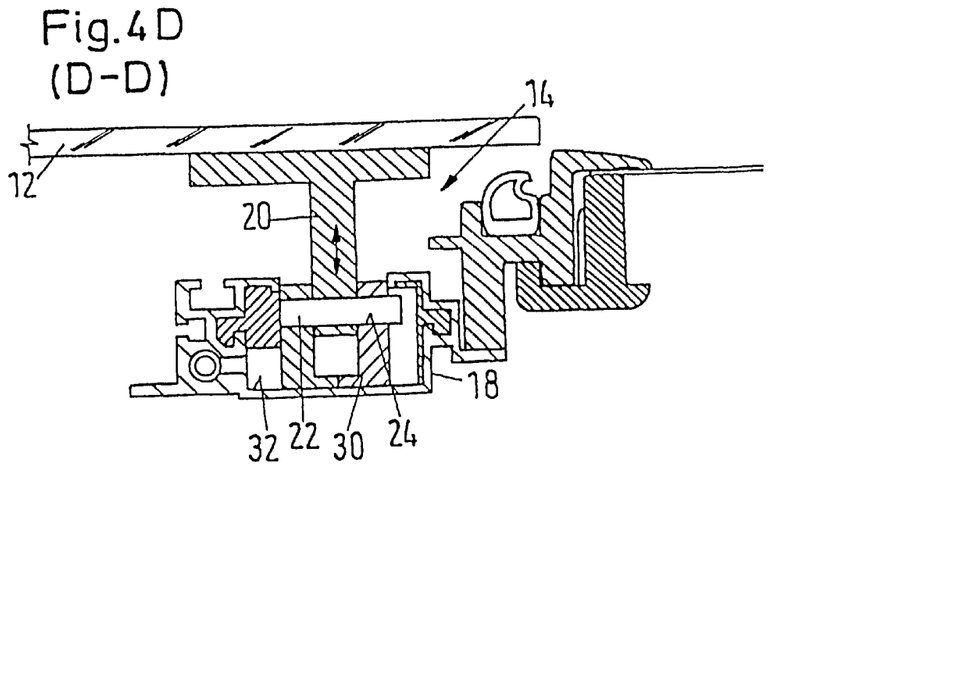
FIG. 4D is a vertical section through the same spoiler roof along line D—D according to FIG. 2A.
Figures 5A, 5B:
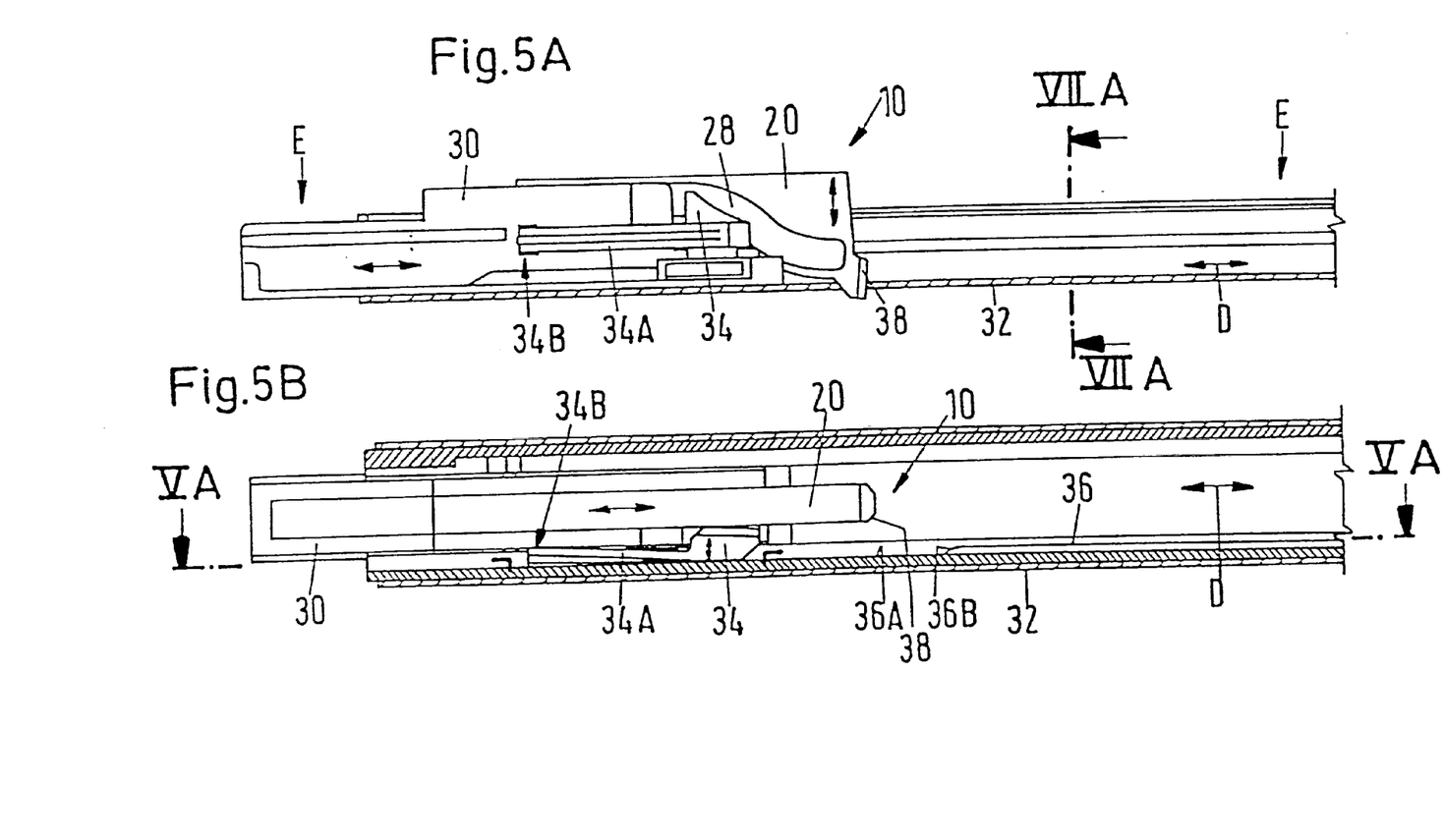
FIG. 5A is a longitudinal section through the adjusting device of a second embodiment of a spoiler roof (sectioned along line VA—VA according to FIG. 5B)
FIG. 5B is a top view of the same adjusting device (view E according to FIG. 5A), wherein the upper guide rail region is also visible in this figure.
Figure 6A:
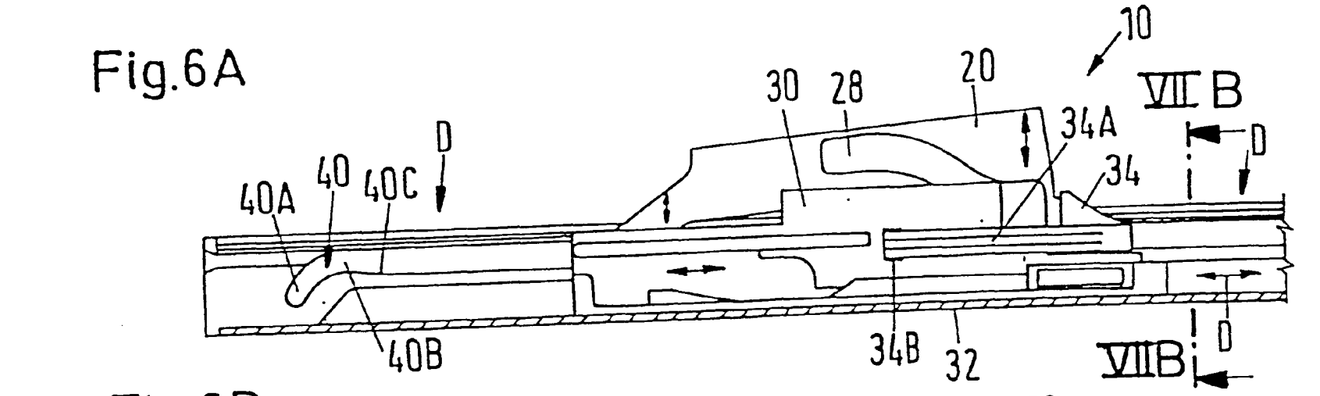
FIG. 6A is the same adjusting device in operating position, in which the cover carrier is tilted and slid (corresponding to the operating position in FIG. 3), in the form of a longitudinal section along line VIA—VIA according to FIG. 6B.
Figure 6B:
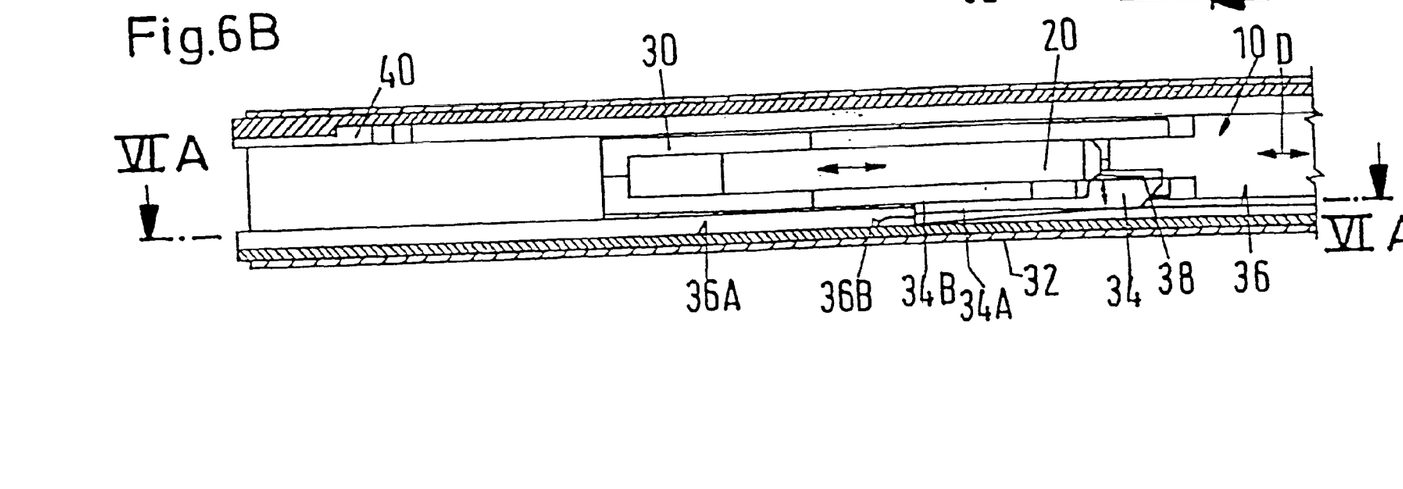
FIG. 6B is a top view of the same adjusting device (view D according to FIG. 6A), wherein the upper guide rail region is also visible in this figure.
Figure 7A:
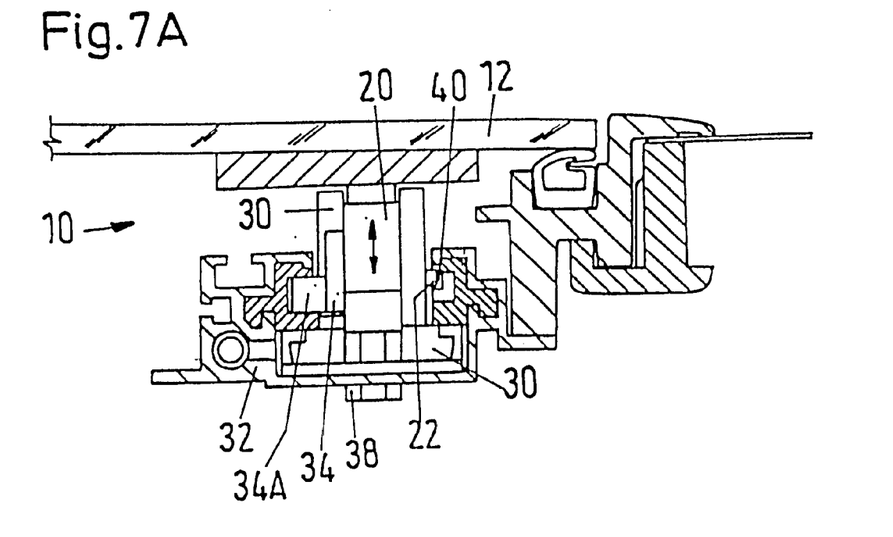
FIG. 7A is a vertical section through the same spoiler roof along line VIIA—VIIA according to FIG. 5A.
Figure 7B:
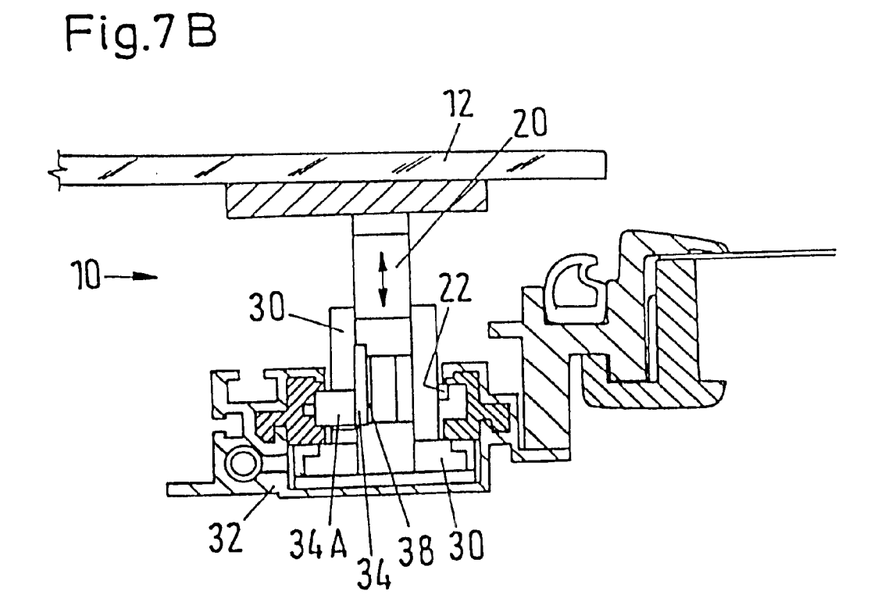
FIG. 7B is a vertical section through the same spoiler roof along line VIIB—VIIB according to FIG. 6A.

When the transport carriage 30 is slid forward again from its open position shown in FIGS. 3A/3B in order to gradually close the roof opening 14, the engagement means 34 in the transport carriage 30 drives the cover carrying element 20 and is subjected to stress. The engagement means 34 is only returned into its disengaged position according to FIG. 2B shortly before the carriage sliding position shown in FIGS. 2A/2B is reached again. This process takes place automatically due to the forward sliding of the transport carriage 30 (sliding toward the left in the figure). This automation is attained due to a suitable inclination of the catch limit stop 38 and the corresponding end region of the engagement means 34, whereby the outer region of the first cam pin 22 is already moved into the third guide curve 40 and adjoins the region of the guide curve which extends transversely downward in this position. Consequently, the resistance generated between the transport carriage 30 and the cover carrying element 20 only need be high enough that the engagement means 34 is laterally slid into the depression 36A of the control means 36. If the corresponding inclined surfaces of the engaging limit stop 38 and the engagement means 34 are suitably shaped, the force required for this lateral sliding is so low that it can be barely noticed.

Consequently, the end of the sliding path of the cover part 12 in the closing direction and the transition into the lowering phase of the cover part 12 are not subject to jolts. This effect is even promoted due to the fact that the first guide curve 24 in the transport carriage 30 has a nearly horizontal progression on its front end 24A, i.e., a progression that extends parallel to the guide element 32. This nearly horizontal progression not only serves as an insertion aid into the open end of the third guide curve 40, but also allows a completely smooth transition of the movement of the first cam pin 22 from its raised position into the subsequent lowering phase.

The first embodiment as well as all embodiments described below are also suitable for several cover parts that are arranged behind one another, i.e., so-called multi-spoiler roofs.

In the second embodiment according to FIGS. 5A through 7B, only the design of the engagement means 34 differs from that of the first embodiment: in this case, the engagement means 34 is no longer arranged in slidable fashion, but rather in tilted fashion on the transport carriage 30. An opening in the transport carriage 30 which is adapted to the cross section of the engagement means may, in contrast to the first embodiment, be eliminated. FIGS. 5B and 6B clearly show that the engagement means contains a pivot arm 34A that is realized in the form of a one-armed lever, carries the engagement means 34 on its free lever end, and contains a pivot point 34B arranged on the transport carriage 30 on its front end. A cam arrangement 22, 24 analogous to that of the first embodiment is also provided in the second embodiment but is not shown in the figure because it is arranged inside the transport carriage 30.

Figure 8A:
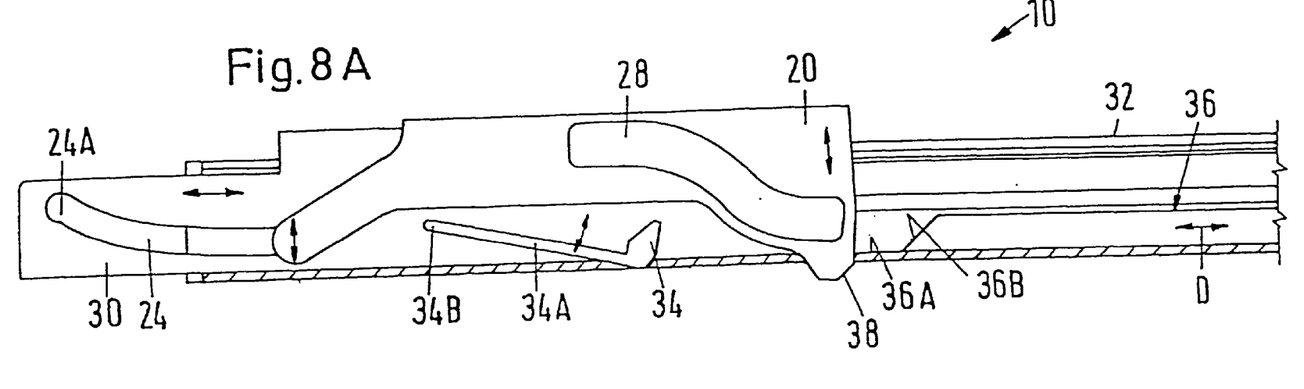
FIG. 8A is a longitudinal section through a third embodiment of a spoiler roof which corresponds to the representation in FIG. 5A; and, FIG. 8B is a longitudinal section through the same adjusting device which corresponds to the representation in FIG. 6A.
Figure 8B:
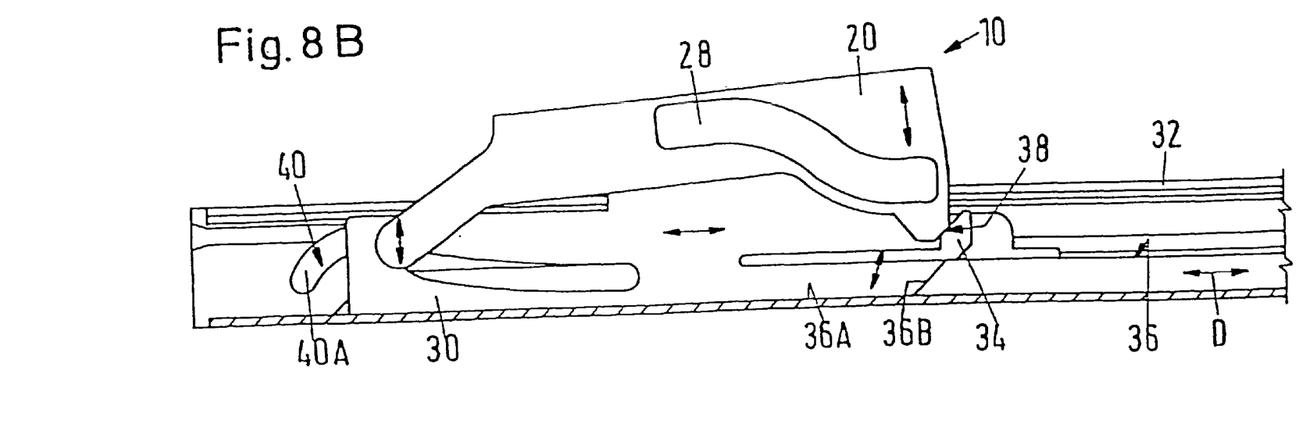

In the third embodiment according to FIGS. 8A and 8B, the difference in comparison to the first embodiment can be seen in the fact that the moving direction of the engagement means 34 does not extend horizontally, but rather vertically, whereby the control means 36 is located on the bottom wall of the guide element 32. In other respects, the design of the engagement means in the form of a lever corresponds to that of the second embodiment according to FIGS. 5A through 7B.

Having thus described the invention, it is claimed:

1. An adjusting device for a sunroof that contains at least one cover part for selectively closing and at least partially opening an opening in a rigid roof surface of an automobile, wherein the roof opening is limited by a base part with side parts that lie opposite one another and define a longitudinal direction, and wherein said cover part can be tilted as well as slid along said longitudinal direction, said adjusting device comprising, at least one cover carrying element that is connected to said cover part and that can be pivoted about a first cam pin which extends transverse to said longitudinal direction and can slide along said longitudinal direction, at least one guide element that extends along said longitudinal direction and that is provided on said base part, a single carriage element that is slidably guided along each of said guide element, wherein said carriage element moves said cover part and said cover carrying element, an adjusting means for tilting and sliding said cover part, wherein said adjusting means connects said cover part to the carriage element such that they can be moved relative to one another and can slide along said longitudinal direction, at least one engagement means for independently engaging said carriage element and said cover carrying element in said longitudinal direction for entrainment of said cover carrying element in said longitudinal direction while sliding said cover part only in said longitudinal direction towards its tilting position, said at least one guide element being provided with at least one control means, such that said carriage element and said cover carrying element are effectively engaged in said longitudinal direction preventing movement relative to one another, when said carriage element slides between positions between which said cover part only slides in said longitudinal direction in the tilted position, and, said carriage element and said cover carrying element being disengaged from one another so that each is able to move relative to the other in said longitudinal direction when said carriage element slides between positions in which said cover part is generally aligned with said roof opening and tilted.

2. The adjusting device of claim 1, wherein said engagement means acts on one side of said cover carrying element and is arranged so that it only transmits driving forces onto said cover carrying element during the closing movement of said carriage element during sliding.

3. The adjusting device of claim 2, wherein the engagement means engages behind the rear end region of the adjusting means in the engaged position.

4. The adjusting device of claim 2, wherein the control means is arranged on the guide element, and the control means contains a depression for partially accommodating the engagement means in the disengaged position.

5. The adjusting device of claim 1, wherein said control means contains a switching surface for sliding said engagement means during the opening movement of said carriage element from the disengaged position into a position in which said carriage element and said cover carrying element are engaged.

6. The adjusting device of claim 1, wherein the engagement means is provided with a pivot arm for pivoting the engagement means about a pivot point arranged on the carriage element.

7. The adjusting device of claim 1, including a first cam arrangement and a second cam arrangement that act between the cover carrying element and the carriage element for raising and lowering movements of the adjusting means.

8. The adjusting device of claim 7, wherein the first cam arrangement is for raising the front edge of the cover and is provided with a front guide curve zone which is aligned to the longitudinal direction and slopes rearwardly to said longitudinal direction.

9. The adjusting device of claim 1, including a third guide curve that acts between said adjusting means and said guide element, said third guide curve arranged within the front of said guide element having a region that extends obliquely upward and transforms into a region that extends approximately parallel to said longitudinal direction.

10. The adjusting device of claim 9, wherein the third guide curve contains an opening that is directed toward the rear and acts as an inlet and an outlet for the first cam pin.

* * * * *